(12) United States Patent
Goebel et al.

(10) Patent No.: US 7,395,188 B1
(45) Date of Patent: Jul. 1, 2008

(54) SYSTEM AND METHOD FOR EQUIPMENT LIFE ESTIMATION

(75) Inventors: Kai Frank Goebel, Mountain View, CA (US); Piero Patrone Bonissone, Schenectady, NY (US); Weizhong Yan, Clifton Park, NY (US); Neil Holger White Eklund, Schenectady, NY (US); Feng Xue, Clifton Park, NY (US); Hai Qiu, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/608,076

(22) Filed: Dec. 7, 2006

(51) Int. Cl.
  G06F 11/30 (2006.01)
  G21C 17/00 (2006.01)
(52) U.S. Cl. .................................................... 702/184
(58) Field of Classification Search .......... 702/179–185
See application file for complete search history.

(56) References Cited

U.S. PATENT DOCUMENTS

| | | |
|---|---|---|
| 5,210,704 A | 5/1993 | Husseiny |
| 6,466,877 B1 | 10/2002 | Chen et al. |
| 6,519,534 B2 | 2/2003 | Chen et al. |
| 6,748,341 B2 | 6/2004 | Crowder, Jr. |
| 6,853,951 B2 | 2/2005 | Jarrell et al. |
| 6,928,370 B2 | 8/2005 | Anuzis et al. |
| 7,027,953 B2 | 4/2006 | Klein |
| 2004/0236450 A1 | 11/2004 | Bryant et al. |
| 2004/0236563 A1 | 11/2004 | Rachlin |
| 2005/0001627 A1* | 1/2005 | Anbuky et al. ............. 324/427 |
| 2005/0005186 A1* | 1/2005 | Goebel et al. ................. 714/1 |
| 2005/0165520 A1 | 7/2005 | Ariyur |
| 2005/0171736 A1 | 8/2005 | Kang |
| 2007/0198215 A1* | 8/2007 | Bonanni et al. ............. 702/183 |

* cited by examiner

Primary Examiner—Michael P Nghiem
(74) Attorney, Agent, or Firm—Scott J. Asmus (57) ABSTRACT

A method to predict equipment life is disclosed. The method includes making available a set of input parameters, and defining a model of a health of the equipment as a function of the set of input parameters. The method continues with receiving at least one signal representative of a respective one of an actual sensor output relating to an actual operation attribute margin of the equipment, predicting a remaining useful equipment life based upon a sequence of outputs of the model of the health of the equipment, and generating a signal corresponding to the remaining useful equipment life.

22 Claims, 5 Drawing Sheets

SYSTEM AND METHOD FOR EQUIPMENT LIFE ESTIMATION

BACKGROUND OF THE INVENTION

The present disclosure relates generally to life estimation, and particularly to equipment subsystem life estimation.

Estimating a remaining useful life, also herein referred to as a remaining life, of a subsystem is known in the art as prognostics. Remaining life estimates provide valuable information for operation of modern complex equipment. Remaining life estimates provide decision making aids that allow operators to change operational characteristics (such as load), which in turn may prolong a life of the subsystem. Remaining life estimates also allow planners to account for upcoming maintenance and set in motion a logistics process that supports a smooth transition from faulted to fully functioning equipment. Predicting remaining life is not straightforward because, ordinarily, remaining life is dependent upon future usage conditions, such as load and speed, for example. In addition, an understanding of the underlying physics that govern remaining life is hard to come by in particular for complex machinery where numerous fault modes can potentially be the driver for remaining life. Examples of equipment that may benefit from use of remaining life estimates are aircraft engines (both military and commercial), medical equipment, and power plants.

A common approach to prognostics is to employ a model of damage propagation contingent on future use. Such a model is often times based on detailed materials knowledge and makes use of finite element modeling. Because such models are extremely costly to develop, they are limited to a few important parts of a subsystem, but are rarely applied to a full subsystem.

Another approach is a data-driven approach to take advantage of time series data where equipment behavior has been tracked via sensor measurements during normal operation all the way to an end of equipment useful life. The end of equipment useful life can represent a totally non-functioning state of the equipment for example, equipment failure. The end of equipment useful life can also represent a state of the equipment wherein the equipment no longer provides expected results. When a reasonably-sized set of these observations exists, pattern recognition algorithms can be employed to recognize these trends and predict remaining life. These predictions are often made under an assumption of near-constant future load conditions. However, such run to end of equipment useful life data are often not available because, when an observed system is complex, expensive, and, safety is important, such as aircraft engines, for example, faults will be repaired before they lead to the end of equipment useful life. This deprives the data-driven approach from information necessary for its proper application.

Accordingly, there is a need in the art for a life estimation arrangement that overcomes these limitations.

BRIEF DESCRIPTION OF THE INVENTION

An embodiment of the invention includes a method to predict equipment life. The method includes making available a set of input parameters, and defining a model of a health of the equipment as a function of the set of input parameters. The method continues with receiving at least one signal representative of a respective one of an actual sensor output relating to an actual operation attribute margin of the equipment, predicting a remaining useful equipment life based upon a sequence of outputs of the model of the health of the equipment, and generating a signal corresponding to the remaining useful equipment life.

Another embodiment of the invention includes a prediction system for predicting life of equipment. The prediction system includes a database comprising a set of input parameters, a processor in signal communication with the database, and a computational model application for executing on the processor, the computational model application performing a method. The method includes defining a model of a health of the equipment as a function of the set of input parameters, receiving at least one signal representative of a respective one of an actual sensor output relating to an actual operation attribute margin of the equipment, predicting a remaining useful equipment life based upon a sequence of outputs of the model of the health of the equipment, and generating a signal corresponding to the remaining useful equipment life.

The system includes a database including a set of input parameters, a processor in signal communication with the database, and a computational model application for executing on the processor. The computational model performs a method including executing the computational model with the set of input parameters to define at least one modeled sensor output, and defining a model of a health of the equipment as a function of the set of input parameters. The method continues with receiving at least one signal representative of a respective one of an actual sensor output relating to an actual operation attribute margin of the equipment and predicting a remaining useful equipment life based upon a sequence of outputs of the model of the health of the equipment.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention will provide a subsystem level prognostics process over an entire subsystem without needing to assess the model of damage propagation mechanics at the materials level. In an embodiment, the process will operate in an absence of complete run to end of equipment useful life time series data.

An embodiment of the invention will utilize a hybrid model-based and data-driven approach to address particular challenges of a low-sampling rate of operational data available and to capitalize on thermodynamic engine models. An embodiment will take advantage of fault signature instances obtained by the model while observing partial fault trajectories in real data. An embodiment will transform engine observations into a space in which end-of-life margins can be defined. The equivalent of inverse damage propagation lines are then fit to the transformed observations, which allows remaining useful life to be estimated. In an embodiment, different sources of uncertainty are quantified. To that end, uncertainties such as engine model uncertainty, fault modeling uncertainty, sensor noise, variations in time of fault identification, variations in duration of fault condition, variations in fault propagation assumptions, and variations in transfer function parameters, for example, are considered.

As used herein, the term prognostics shall refer to the estimation of remaining useful subsystem life. The remaining useful life (RUL) estimates are in units of time or cycles. A time estimate typically has associated uncertainty that is described as a probability density curve around an actual estimate. Operators can choose a confidence that allows them to incorporate a risk level into their decision making. Typically, a confidence level on RUL estimates increases as a prediction horizon decreases, such as toward an approach of an end of component life, for example.

Prognostics is closely linked to diagnostics. As used herein, the term diagnostics shall refer to a detection of a fault condition, or an observed change in an operational state that is related to a verifiable event. A fault is a first sign of a potential end of equipment useful life at some future time. An example of such a fault is an increase in engine fuel consumption resulting from a cracked turbine blade. A direct cost of the end of equipment useful life is unavoidable: ultimately, the equipment must be replaced. Moreover, there are indirect costs to the end of equipment useful life that are in many cases far greater than the direct cost of the repair. One source of indirect costs is secondary damage, for example, an end of the useful life of a component in a compressor stage of a gas turbine often causes damage to the rear stages. Another indirect cost is unscheduled maintenance. It is often less expensive to replace a faulty component during scheduled maintenance before it has reached the end of its useful life than to have a component reach the end of its useful life in the field which may result in unscheduled maintenance and possibly operational disruption.

In the absence of any evidence of damage or faulted condition, prognostics reverts to statistical estimation of fleet-wide life, such as Weibull curves or other suitable mechanisms. It is more common to employ condition-based prognostics in a presence of an indication of abnormal wear, faults, or other non-normal situation. It is therefore important to include accurate diagnostics soon after a fault to provide a trigger point for prognostic algorithms to operate.

Condition-based prediction systems depend on reliable fault diagnostics to initiate prognostic algorithms. If diagnostics recognizes a start point of damage too late, the damage propagation models may lag reality and underestimate a magnitude of damage. If prognostic algorithms are kicked off when there is no real damage, a benefit of remaining life estimation is reduced. Accordingly, presence of an accurate diagnostic fault detection algorithm will be assumed as a basis for an embodiment of a prognostic RUL prediction.

An embodiment of the process is broken down into an off-line training process to develop models used for RUL estimation, and an on-line monitoring process to utilize the developed models for estimating the RUL.

Figure 1:
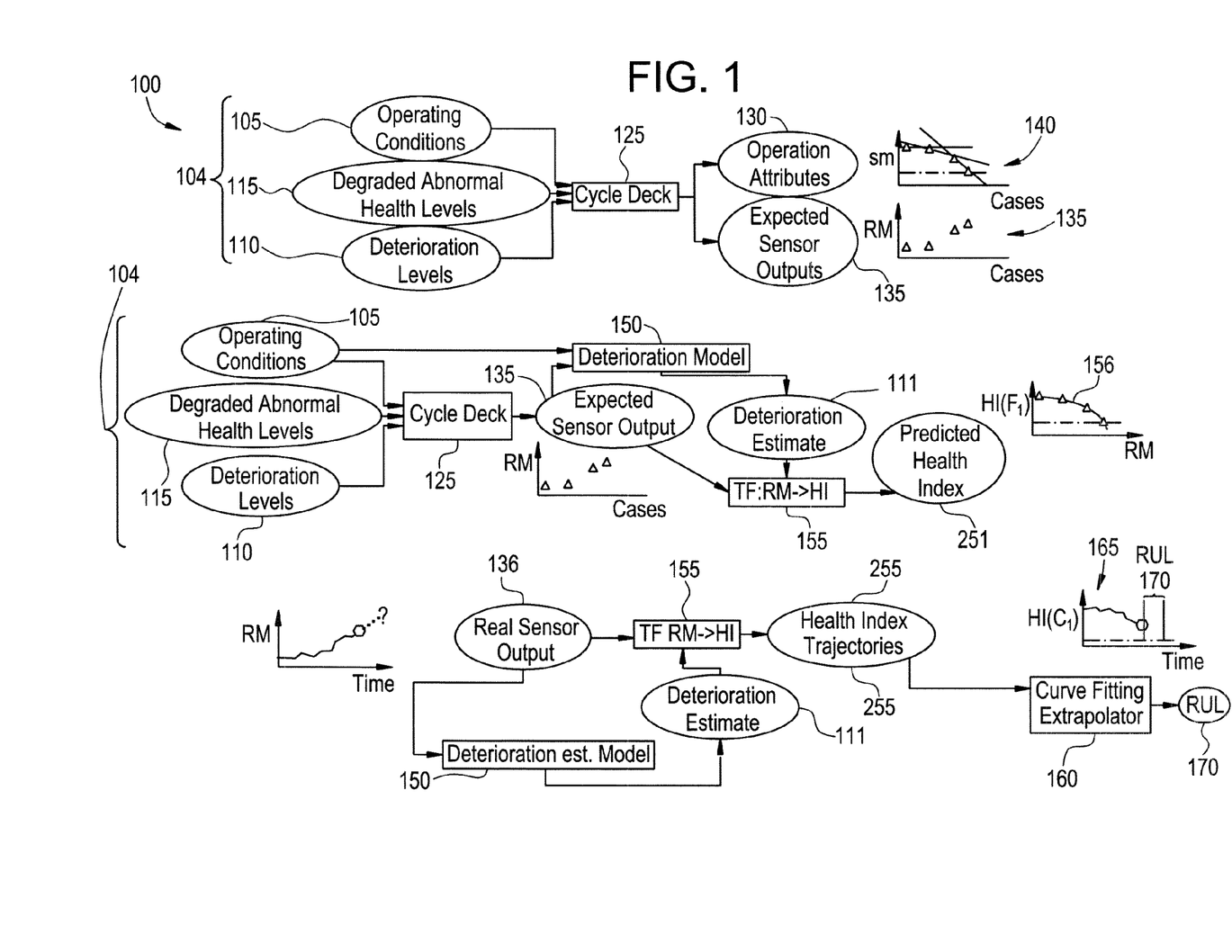
FIG. 1 depicts a schematic flowchart in accordance with an embodiment of the invention.

Referring now to FIG. 1, a schematic flowchart 100 that flows left to right, top to bottom, of an embodiment of the off-line training process is depicted.

In an embodiment, the process will begin with an input of a set of input parameters 104 that include equipment operating conditions 105, various deterioration levels 110 that describe a state of wear of a subsystem of equipment, and various degraded abnormal health conditions 115, at varying magnitudes, to a physics based computational model 125. In an embodiment, the computational model 125 is a thermodynamic component level model of an aircraft engine, also herein referred to as a cycle deck 125. In an embodiment, the equipment is an aircraft engine, and the operating conditions 105 are referred to as points within a flight envelope, and include conditions such as altitude, throttle position, speed, and air temperature, for example. In an embodiment, the degraded abnormal health conditions 115 are defined in terms of combinations of subsystem efficiency and flow. The degraded abnormal health conditions 115 can be faults, but particular fault signatures do not necessarily need to be known at this stage.

In an embodiment, the process will continue by observing at least one output of the cycle deck 125 for normal conditions, deteriorated conditions, and combinations of faults and deterioration, as defined by the set of input parameters 104. The at least one output is assessed over all operating conditions 105, or throughout the entire flight envelope. The at least one output includes modeled operation attribute margins 130, also herein referred to as margins, of the subsystem of interest, as well as expected sensor outputs 135, also herein referred to as modeled sensor outputs. In an embodiment, typical margins 130 include booster stall margin, high pressure compressor (HPC) stall margin, HPC pressure ratio, low pressure turbine (LPT) clearance margin, high pressure turbine (HPT) inlet temperature margin, HPT clearance margin, HPT exit temperature margin, and core speed margin, for example. In an embodiment, some margins 130 are capable to be directly measured as sensor outputs, while other margins 130, such as clearance and stall margin for example, are not capable to be directly measured in the field with current technology. By taking advantage of the cycle deck 125, those margins 130 that cannot be directly measured can be calculated and included into a health assessment process, to be described further below. Therefore, a complete and systematic health estimation, which takes into account all possible margins 130, can be achieved. Sensor outputs may also be referred to as remote monitoring (RM) parameters.

In an embodiment, the process proceeds by normalizing each margin 130. An example stall margin 140 and a set of corresponding sensor outputs 135 for a variety of inputs parameters 104 are depicted. Each margin 130 is normalized by taking a ratio (expressed as a percentage) of the margin 130 provided by the cycle deck 125 that results from input parameters 104 including degraded abnormal health conditions (or faults) and deterioration conditions at a particular point in the flight envelope to the same, corresponding margin 130 resulting from input parameters 104 that include an undeteriorated and fault free engine at the same flight envelope point. It will be appreciated that in an embodiment, the normalization will be performed for many margins 130, at many degraded abnormal health levels (or faults) 115 and deterioration 110 levels, and for many flight envelope 105 points.

Figure 2:
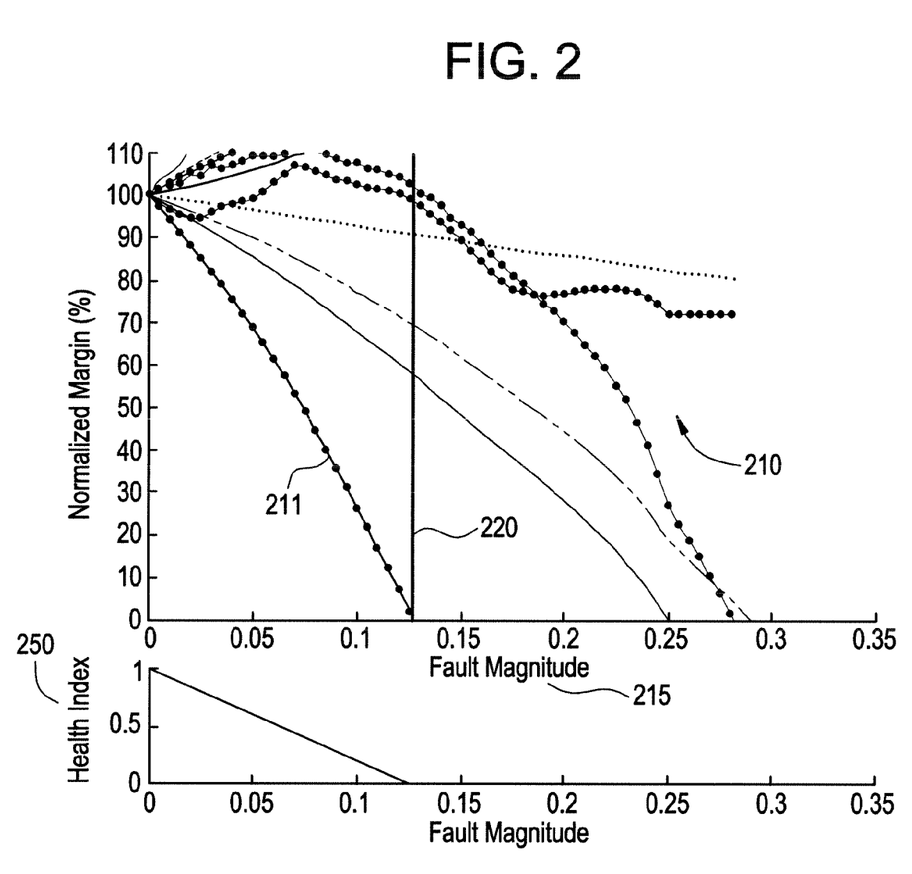
FIG. 2 depicts two charts depicting a plurality of normalized margins and a health index in accordance with an embodiment of the invention.

Referring now to FIG. 2, an illustrative example of a plurality of normalized HPT margins 210 in the presence of an HPT fault is depicted. It will be appreciated that as a value of normalized margins 210, also herein referred to as normalized operation attribute margins, approach 0%, a stronger probability of failure exists, with a 0% normalized margin value defining an existence of failure. As used herein, the term "failure" refers to at least one of the normalized margins 210 violating a specified operational limit, such as a temperature, speed, or clearance limit, for example. Note that some margins 130, depending upon a type of fault, may increase in a presence of at least one of deterioration and fault, and so, when normalized, achieve values over 100%. It will be further appreciated that a normalized margin 211 that reaches the value of 0% with a minimum degraded abnormal health level (or fault magnitude) 215 will be defined as a limiting value, also herein referred to as a limiting normalized operation attribute margin, thereby defining a maximum tolerable degraded abnormal health level (or fault magnitude) 220. A health index (HI) 250 is defined as the limiting normalized operation attribute margin 211, or the most limiting margin 211 for a given degraded abnormal health level (or fault magnitude) 115 and deterioration level 110 at a particular point in the flight envelope 105. For example, the health index 250 may be represented as HI=min($m_1$, $m_2$, . . . $m_n$), where $m_1$, $m_2$, . . . $m_n$ represent the plurality of normalized margins 210.

Referring back now to FIG. 1, an embodiment of the process proceeds by building a deterioration model 150 to provide a deterioration magnitude estimate 111 based upon the expected sensor outputs 135, via a suitable algorithm. In an embodiment, a neural network is used for building and refining the accuracy of the deterioration model 150. Operating conditions 105 or flight envelope points, and the equipment sensor outputs 135, provided by the cycle deck 125, are used as input to the deterioration model 150. The deterioration magnitude estimate 111, output by the deterioration model 150, is used as a training target to ascertain an accuracy of the deterioration model 150. Because the deterioration level 110 is used as an input parameter 104 to the cycle deck 125 to generate the expected sensor outputs 135, it will be used as a basis against which to compare the deterioration magnitude estimate 111 provided by the deterioration model 150. Accordingly, the suitable algorithm will train or refine the model 150 to reduce the differences between the deterioration magnitude estimate 111, and the deterioration level 110 input to the cycle deck 125.

An embodiment of the process will continue by building a transfer function (TF) 155. The TF 155 is a model that defines a relationship between sensor variables (RM) 135 and the health index 250. Accordingly, the TF 155 is configured to provide a predicted health index 251 using the expected sensor outputs 135 and the deterioration estimate 111 as input. The TF 155 is built and trained via a suitable algorithm in a fashion similar to the deterioration model 150 described above. In an embodiment, the algorithm to build the TF 155 is a neural network. The health index 250 is used as a training target, to ascertain the accuracy of the TF 155, with the expected sensor outputs 135 and the deterioration estimate 111, provided by the deterioration model 150, used as the training input to develop the TF 155. An output of the TF 155, or a health assessment of the equipment, is depicted graphically as chart 156.

Figure 3:
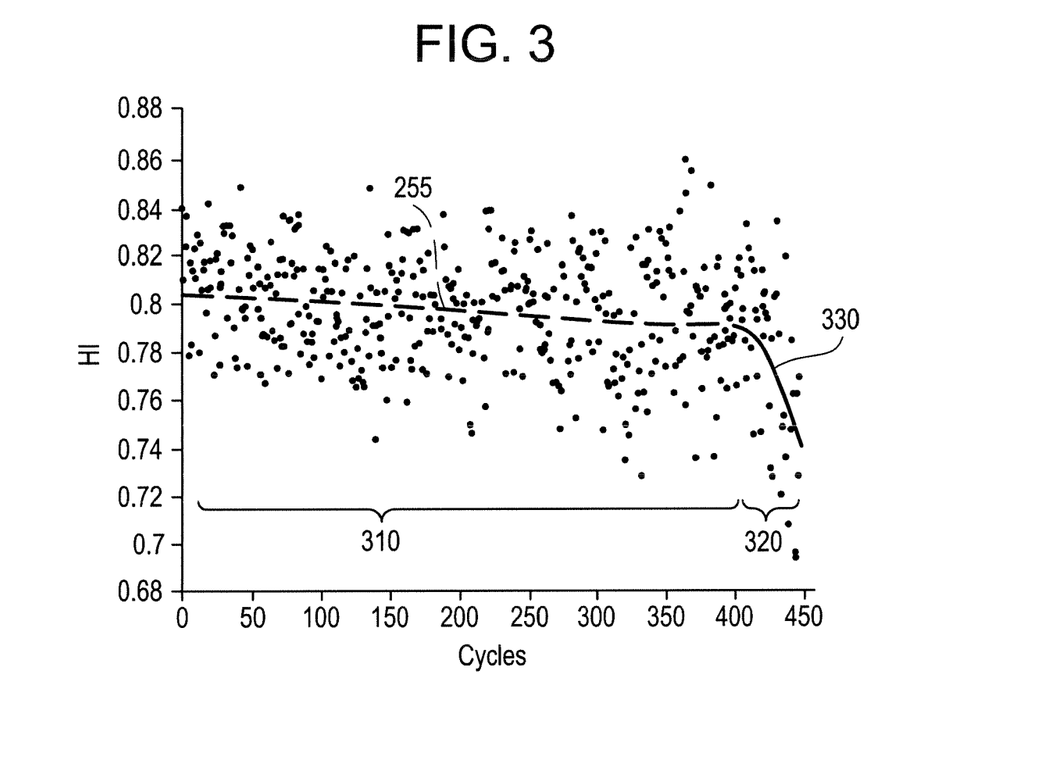
FIG. 3 depicts a chart depicting a health index trajectory in accordance with an embodiment of the invention.

In an embodiment, the method will continue by using a historical time series of signals representative of actual sensor data 136 from engines that are known to have experienced serious faults as input to the TF 155. Output from the TF 155 are HI trajectories 255. Referring now to FIG. 3, an exemplary HI trajectory 255 is plotted as a line among many individual HI 250 points. Under normal operating conditions, represented by a dashed line within a first portion 310, a typical HI trajectory 255 will drop at a steady pace, or a small slope that is reflective of normal equipment deterioration. However, subsequent to an occurrence of a fault, as represented by a solid line within a second portion 320, the slope of the HI trajectory 255 will decrease dramatically, and the HI trajectory 255 will drop significantly downward. HI trajectories 255 are recorded to the point where maintenance was performed, prior to an end of equipment useful life. In an embodiment, a curve fitting extrapolator 160 (shown in FIG.

1) will fit an exponentially decaying curve 330 for the time period subsequent to fault initiation, within the second portion 320. The curve 330 can be fit to several different functions. In an embodiment, the curve function is $y=b+m\cdot(1-e^{\alpha \cdot x})$. In an embodiment, b is the value at the fault initiation point, m is a multiplier, such as m=2, for example, $\alpha$ is modifier, and n is an exponent, such as n=2.5, for example.

An embodiment of the invention continues by finding an intersection of the fitted curve 330 and the constant HI=0, depicted graphically by a chart 165 in FIG. 1, which represents a mean of the estimated time of failure. A RUL 170 estimation is a difference between the estimated time of failure and a current time step. A statistical technique to estimate a variance of the data, such as bootstrapping, for example, is used to estimate confidence intervals for the RUL 170 estimation.

In an embodiment, a noise distribution obtained during normal operation, that is prior to the fault initiation, as depicted by the first portion 310 in FIG. 3, is used to superimpose noise onto the RUL 170 estimate. In an embodiment, the data are then ready for training of other remaining life estimators.

In an embodiment, the on-line monitoring process is intended to utilize actual data collected to provide the RUL 170 estimate following a discovery of a fault. In an embodiment, the on-line monitoring process will utilize a bank of models, based on diagnostic information developed by the off-line training process described above. In an embodiment, the bank of models can be executed selectively or in parallel. In an embodiment, there are dedicated models for each of at least one sub-system within a system of interest. In an embodiment, the models may be further refined by root cause. In an embodiment, the on-line monitoring process can operate in several modes.

In an embodiment, one mode of the on-line monitoring process will calculate the HI 250 via the TF 155 at all times, such as for every sample, or flight, for example. In an embodiment, this mode will proceed independently of fault triggers from diagnostics, and provide additional information about the RUL 170 only when a fault indication is given.

In another embodiment, a mode of the on-line monitoring process is such that the prognostics module remains dormant, and "awakes" when prompted by a diagnostic flag, such as the indication of a fault, for example. In response to the diagnostic flag, data prior to the diagnostic flag are retrieved to calculate the HI 250 data.

In an embodiment, both of the on-line monitoring processes described will fit an exponentially decaying curve to the HI 250 trajectory 255 following the diagnostic flag. The curve can be fit to several different functions. An embodiment includes the function $y=b+m\cdot(1-e^{\alpha \cdot x})$ where b is the value at the fault initiation point, m is a multiplier such as m=2, for example, $\alpha$ is modifier, and n is an exponent, such as n=2.5, for example.

A mean of the RUL 170 estimate at a time step of interest is the difference between the current time and the intersection of the fitted exponentially decaying line and the constant HI=0. In an embodiment, a statistical technique to estimate a variance of the data, such as bootstrapping, for example, is used to estimate confidence intervals for the RUL 170 estimation. In an embodiment, the curve fitting and RUL 170 estimate are performed dynamically, that is, for every point for which a HI 250 is available.

Figure 4:
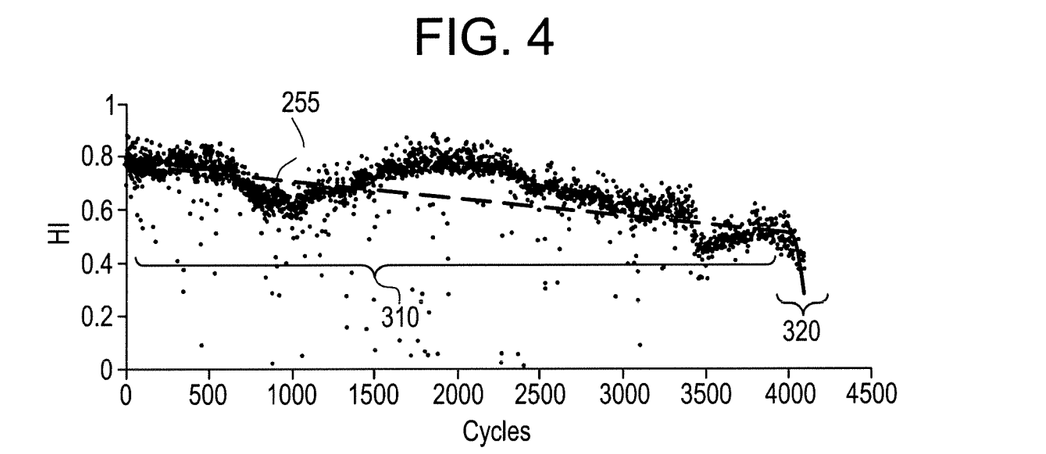
FIG. 4 depicts a chart depicting a health index trajectory applied to collected data in accordance with an embodiment of the invention.

The RUL estimation process has been tested in experiments, using actual data relating to an aircraft engine, as depicted in FIG. 4. It will be appreciated that application of the prediction process disclosed herein to the actual data depicts the HI trajectory 255. It can be seen that the HI trajectory 255 includes the first portion 310 represented by the dashed line therein. The dashed line depicts a drop at a steady pace, reflective of normal engine deterioration. However, subsequent to the occurrence of the fault, the second portion 320, represented by the solid line, has the slope of the HI trajectory 255 that decreases dramatically.

Figure 5:
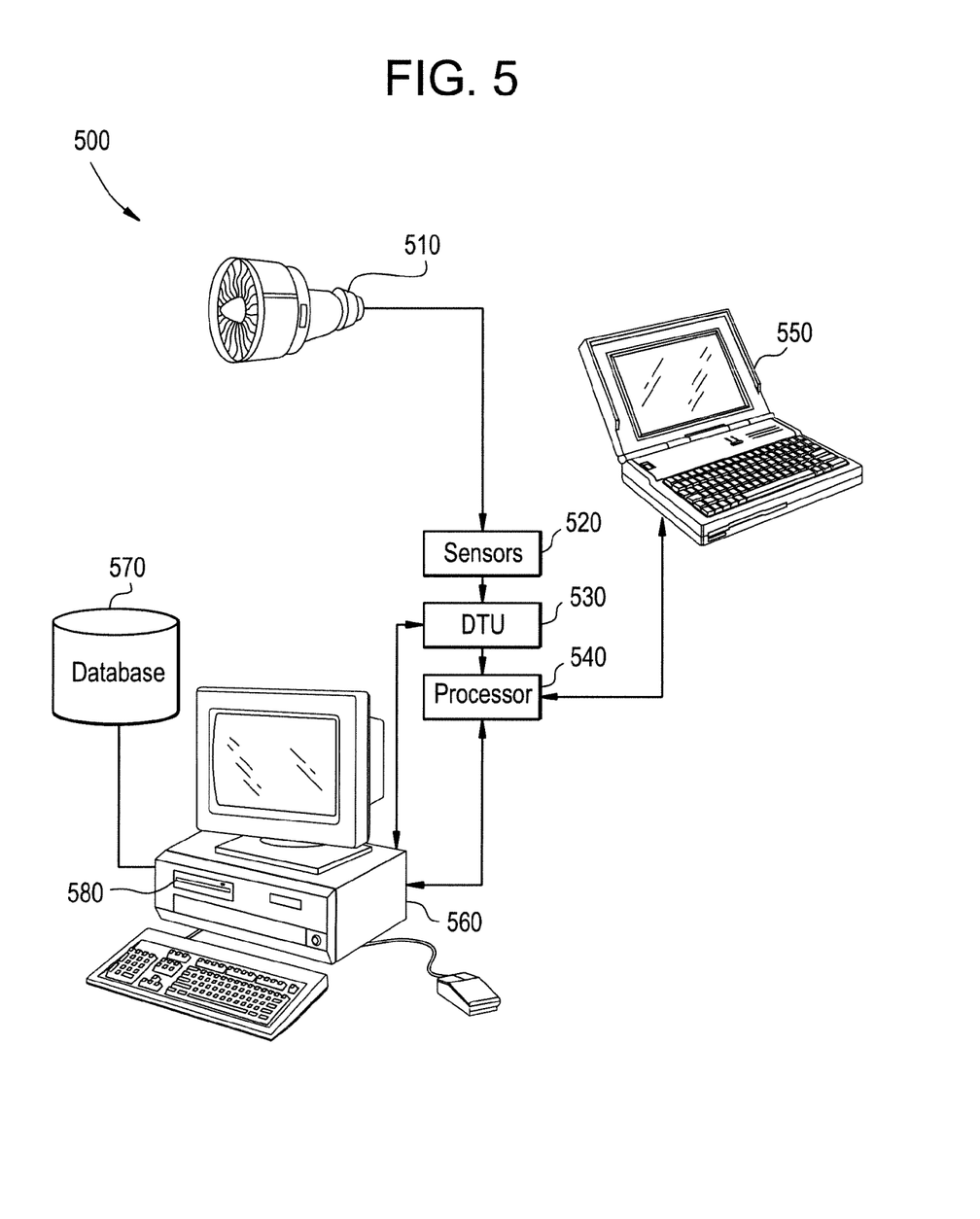
FIG. 5 depicts a schematic diagram of a prediction system in accordance with an embodiment of the invention.

Referring now to FIG. 5, an exemplary embodiment of a prediction system 500 is depicted. In an embodiment, the prediction system includes a turbine engine 510, at least one actual sensor 520, a data transfer unit (DTU) 530, a processor 540, an interface unit 550, a computer 560, and a database 570. The computer 560 further includes a program storage device 580.

While an embodiment of the process has been described having a turbine engine, it will be appreciated that the scope of the invention is not so limited, and that the invention will also apply to prediction systems including other pieces of equipment, such as locomotive engines, medical equipment, and rolling mills, for example.

In an embodiment, the at least one sensor 520 is disposed and configured to be responsive to an operating condition of the engine 510, and to generate a signal representative of the operating condition of the engine 510. The at least one sensor 520 is in signal communication with the data transfer unit 530, which makes available to the processor 540 the signal representative of the operating condition of the engine 510.

In an embodiment, the processor 540 is in signal communication with an interface device 550, such as to allow for the on-line monitoring process, as described herein. The processor 540 is also in signal communication with the computer 560. In an embodiment, the computer 560 is in signal communication with the database 570, which is configured to store and make available to the computer 560 the set of input parameters 104. The computer 560 also includes the program storage device 580 configured to store, and make available to the computer 560 for execution, the computational model 125.

While an embodiment of the invention has been described having a computer in signal communication with the processor, it will be appreciated that the scope of the invention is not so limited, and that the invention will also apply to prediction systems that have the computer in direct signal communication with the data transfer unit. It will be further appreciated that an embodiment of the invention will also include the computer in signal communication via the data transfer unit via a variety of communication protocols, such as cellular, wireless internet, and others, for example, to allow an connection between the computer and the data transfer unit during use of the equipment, to enable a remote, on-line monitoring process.

Figure 6:
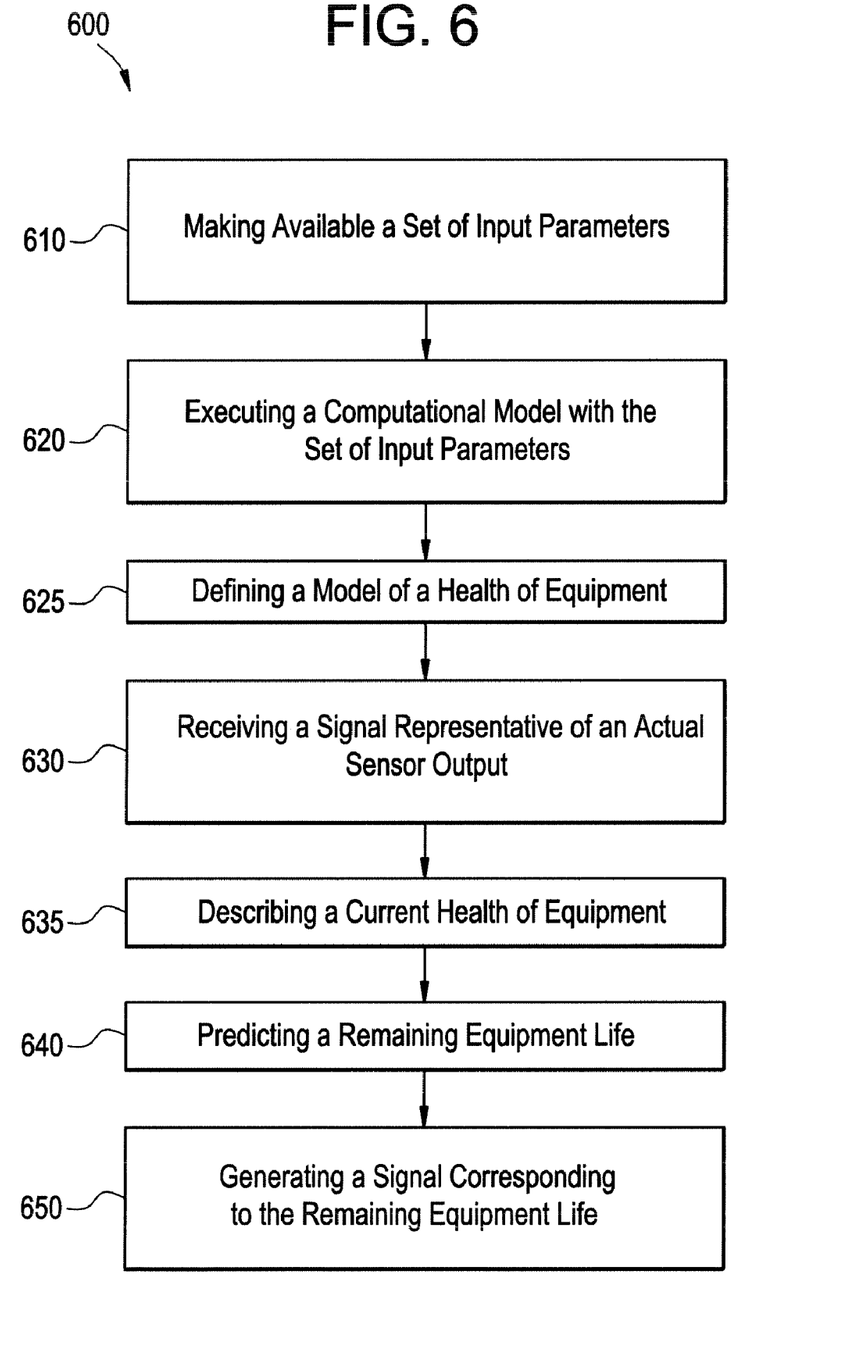
FIG. 6 depicts a flowchart of a method for estimating equipment life in accordance with an embodiment of the invention.

In view of the foregoing, the prediction system 500 performs the method of predicting equipment life. Referring now to FIG. 6, an embodiment of a generalized flowchart 600 of an exemplary method of predicting equipment life is depicted.

The method begins in the off-line mode with making available 610 the set of input parameters 104 to the computational model 125. An embodiment includes executing 620 the computational model with the set of input parameters 104 to define the at least one modeled sensor output 135. The method continues with defining 625 the transfer function 155, or a model of a health of the equipment as the function of the set of input parameters 104. In the on-line mode, the method continues with receiving 630 the at least one signal representative of a respective one of the actual sensor output 136 relating to the actual operation attribute of the equipment. The method continues with describing 635 the current health 156 of the equipment. The method continues with predicting 640 the remaining useful equipment life 170 based upon a sequence of outputs of the TF 155 of the health of the equipment, and generating 650 the signal corresponding to the remaining useful equipment life. In an embodiment, the predicting 640 includes assessing a plurality of operational data prior to an end of the equipment useful life. In an embodiment, the signal corresponding to the remaining useful equipment life will cause the predicted remaining useful equipment life to be displayed via at least one of the computer 560 and the interface device 550.

In an embodiment, the predicting 640 includes extrapolating the trajectory of the sequence of outputs of the TF 155. In another embodiment, the extrapolating includes the exponential curve fit. In an embodiment, the set of input parameters 104 are input parameters 104 of the gas turbine engine 510. In an embodiment, the making available 610 the set of input parameters 104 includes the operating conditions 105, the degraded abnormal health conditions, or levels 115, and the deterioration conditions, or levels 110.

In an embodiment, the method further includes executing the computational model 125 with the set of input parameters 104 to define the modeled margin 130. In an embodiment, the method further includes defining the health of the equipment by the most limiting of the at least one modeled margin 130. In an embodiment, the modeled margin 130 includes at least one of booster stall, high pressure compressor stall, high pressure compressor pressure ratio, low pressure turbine clearance, high pressure turbine inlet temperature, high pressure turbine clearance, high pressure turbine exit temperature, and core speed. An embodiment includes making available the degraded abnormal health condition 115 including efficiency and flow.

In an embodiment, the method further includes predicting the deterioration magnitude estimate 111 via the deterioration model 150 using the operating condition 105 and the modeled sensor output 135. In an embodiment, the method further includes training, or refining the deterioration model 150 by comparing the predicted, or estimated deterioration magnitude 111 with the set of input parameters 104, including the deterioration level 110, to define a deterioration estimation error, and, changing or refining, via a suitable algorithm, the deterioration model 150 to reduce the deterioration estimation error. In an embodiment, the suitable algorithm is the neural network.

In an embodiment, the method further includes comparing the modeled margin 130, defined using the set of input parameters 104 absent the degraded abnormal health condition 115 with the corresponding modeled operation attribute 130 defined using the set of input parameters 104 including the degraded abnormal health condition 115 to develop the plurality of normalized operation attributes 210. In an embodiment, the method includes defining the health index 250 based upon the plurality of normalized operation attributes 210. In an embodiment, the comparing includes comparing the plurality of modeled operation attributes 210 defined using the set of input parameters 104 absent the degraded abnormal health level (or fault magnitude) 215 with the corresponding plurality of modeled operation attributes 210 defined using the set of input parameters 104 including the degraded abnormal health level (or fault magnitude) 215 to develop the plurality of normalized margins 210. The method further includes defining the limiting normalized margin as the normalized margin having a minimum value at any given, or specific, degraded abnormal health level (or fault magnitude) and defining the health index 250 based upon the limiting normalized margin 211 corresponding to the minimum degraded abnormal health level (or fault magnitude) 215.

In an embodiment, the method further includes developing the transfer function 155 that makes available the predicted health index 251 using the modeled sensor output 135 and the predicted deterioration condition, or estimate 111. In an embodiment, the method further includes comparing the predicted health index 251 to the defined health index 250 to define a health estimation error, and changing, or refining via a suitable algorithm, the transfer function 155 to reduce the health estimation error. In an embodiment, the suitable algorithm is the neural network.

An embodiment of the invention further includes determining the change in the signal representative of the actual sensor output 136, and predicting the expected change, or health index trajectory 255 via the transfer function 155 using the change in signal representative of the actual sensor output 136. In an embodiment, predicting the remaining equipment life 170 is based upon the predicted expected change in the health index 251, or HI trajectory 255, as made available by the curve fitting extrapolator 160. An embodiment of the invention further includes detecting the degraded abnormal health condition in the equipment 510 and determining the change of the actual sensor output 136 subsequent to the detecting the degraded abnormal health condition.

An embodiment of the invention may be embodied in the form of computer-implemented processes and apparatuses for practicing those processes. Embodiments of the invention may also be embodied in the form of a computer program product having computer program code containing instructions embodied in tangible media, such as floppy diskettes, CD-ROMs, hard drives, USB (universal serial bus) drives, or any other computer readable storage medium, wherein, when the computer program code is loaded into and executed by a computer, the computer becomes an apparatus for practicing the invention. Embodiments of the invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to predict a remaining useful life of equipment.

As disclosed, some embodiments of the invention may include some of the following advantages: the ability to predict a remaining useful life of equipment absent detailed materials level damage propagation models for each part of the equipment; the ability to predict remaining useful life of equipment absent run to failure data; the ability to express overall component health as a function of various operation attributes; the ability to map system observables to component health; the ability to estimate equipment deterioration; the ability to extrapolate remaining life estimates for virtual run-to-failure; and the ability to provide remaining life estimates during on-line equipment life assessment.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method to predict equipment life comprising:
making available a set of input parameters, wherein the making available comprises making available an operating condition, a degraded abnormal health condition, and a deterioration condition;
executing a computational model with the set of input parameters to define at least one modeled operation attribute margin;
comparing the modeled operation attribute margin defined using the set of input parameters absent the degraded abnormal health condition with a corresponding modeled operation attribute margin defined using the set of input parameters comprising the degraded abnormal health condition to develop a normalized operation attribute margin;
defining a health index based upon the normalized operation attribute margin; defining a model of a health of the equipment as a function of the set of input parameters;
receiving from the model of the health of the equipment at least one signal representative of a respective one of an actual sensor output relating to an actual operation attribute margin of the equipment;
predicting a remaining useful equipment life based upon a sequence of outputs of the model of the health of the equipment; and
generating a signal corresponding to the remaining useful equipment life.

2. The method of claim 1, wherein the predicting comprises:
assessing a plurality of operational data prior to an end of equipment useful life.

3. The method of claim 1, wherein the predicting comprises:
extrapolating a trajectory of the sequence of outputs of the model of the health of the equipment.

4. The method of claim 3, wherein the extrapolating comprises:
extrapolating the trajectory of the sequence of outputs of the model of the health of the equipment using an exponential curve fit.

5. The method of claim 1, further comprising:
defining the health of the equipment by a most limiting one of the at least one modeled operation attribute margin.

6. The method of claim 1, wherein:
the making available the set of input parameters comprises supplying the set of input parameters of a gas turbine engine; and
the executing the computational model with the set of input parameters to define the modeled operation attribute margin comprises defining the modeled operation attribute margin to comprise at least one of booster stall, high pressure compressor stall, high pressure compressor pressure ratio, low pressure turbine clearance, high pressure turbine inlet temperature, high pressure turbine clearance, high pressure turbine exit temperature, and core speed.

7. The method of claim 6, wherein the making available comprises:
making available a degraded abnormal health condition comprising efficiency and flow.

8. The method of claim 1, further comprising:
executing a computational model with the set of input parameters to define at least one modeled sensor output; and
predicting a deterioration magnitude via a deterioration model using the operating condition and the modeled sensor output.

9. The method of claim 8, further comprising:
comparing the predicted deterioration magnitude with the deterioration condition to define a deterioration estimation error; and
changing the deterioration model to reduce the deterioration estimation error.

10. The method of claim 1, wherein:
the comparing comprises comparing a plurality of modeled operation attribute margins defined using the set of input parameters absent the degraded abnormal health level with a corresponding plurality of modeled operation attribute margins defined using the set of input parameters comprising the degraded abnormal health level to develop a plurality of normalized operation attribute margins;
the method further comprising defining a limiting normalized operation attribute margin as a normalized operation attribute margin of the plurality of normalized operation attributes having a minimum value at a specific degraded abnormal health level; and
the defining the health index comprises defining the health index based upon the limiting normalized operation attribute margin.

11. The method of claim 1, further comprising:
executing the computational model with the set of input parameters to define at least one modeled sensor output; and
developing a transfer function that makes available a predicted health index using the modeled sensor output and a predicted deterioration condition.

12. The method of claim 11, further comprising:
comparing the predicted health index to the defined health index to define a health estimation error; and
changing the transfer function to reduce the health estimation error.

13. The method of claim 11, further comprising:
determining a change in the signal representative of the actual sensor output; and
predicting an expected change in the health index via the transfer function using the change in the signal representative of the actual sensor output;
wherein the predicting the remaining useful equipment life comprises predicting the remaining useful equipment life based upon the expected change in the health index.

14. The method of claim 13, further comprising:
detecting a degraded abnormal health condition;
wherein the determining the change occurs subsequent to the detecting the degraded abnormal health condition.

15. The method of claim 1, further comprising:
estimating a set of confidence intervals for the predicted remaining useful equipment life via a statistical technique.

16. The method of claim 15, wherein the estimating comprises:
estimating the set of confidence intervals for the predicted remaining useful equipment life via bootstrapping.

17. A program storage device readable by a computer, the device embodying a program or instructions executable by the computer to perform the method of claim 1.

18. A prediction system for predicting life of equipment, the system comprising:
a database comprising a set of input parameters;
a processor in signal communication with the database;
a computational model application for executing on the processor, the computational model performing a method, the method comprising:
executing a computational model application with the set of input parameters to define at least one modeled operation attribute margin wherein the set of input parameters comprise an operating condition, a degraded abnormal health condition, and a deterioration condition;
comparing the modeled operation attribute margin defined using the set of input parameters absent the degraded abnormal health condition with a corresponding modeled operation attribute margin defined using the set of input parameters comprising the degraded abnormal health condition to develop a normalized operation attribute;
defining a health index based upon the normalized operation attribute margin;
defining a model of a health of the equipment as a function of the set of input parameters;
receiving from the model of the health of the equipment at least one signal representative of a respective one of an actual sensor output relating to an actual operation attribute margin of the equipment;
predicting a remaining useful equipment life based upon a sequence of outputs of the model of the health of the equipment; and generating a signal corresponding to the remaining useful equipment life.

19. The system of claim 18, wherein:
the equipment comprises gas turbine engine equipment; and
the modeled operation attribute margin comprises at least one of booster stall, high pressure compressor stall, high pressure compressor pressure ratio, low pressure turbine clearance, high pressure turbine inlet temperature, high pressure turbine clearance, high pressure turbine exit temperature, and core speed.

20. The system of claim 18, wherein the computational model application further performs:
executing the computational model application with the set of input parameters to define at least one modeled sensor output;
predicting a deterioration magnitude via a deterioration model using the operating condition and the modeled sensor output;
comparing the predicted deterioration magnitude with the deterioration condition to define a deterioration estimation error; and
changing the deterioration model to reduce the deterioration estimation error.

21. The system of claim 18, wherein the computational model application further performs:

executing the computational model with the set of input parameters to define at least one modeled sensor output;

developing a transfer function that makes available a predicted health index using the modeled sensor output and a predicted deterioration condition;

comparing the predicted health index to the defined health index to define a health estimation error; and changing the transfer function to reduce the health estimation error.

22. The system of claim 21, wherein the computational model application further performs:

determining a change in the signal representative of the actual sensor output; and predicting an expected change in the health index via the transfer function using the change in the signal representative of the actual sensor output;

wherein the predicting the remaining useful equipment life comprises predicting the remaining useful equipment life based upon the expected change in the health index.

* * * * *

UNITED STATES PATENT AND TRADEMARK OFFICE
CERTIFICATE OF CORRECTION

PATENT NO. : 7,395,188 B1 Page 1 of 1
APPLICATION NO. : 11/608076
DATED : July 1, 2008
INVENTOR(S) : Goebel et al.

It is certified that error appears in the above-identified patent and that said Letters Patent is hereby corrected as shown below:

In Column 1, Line 40, delete "equipment" and insert -- equipment, --, therefor.

In Column 4, Line 25, delete "margin." and insert -- margin, --, therefor.

In Column 6, Lines 4-5, delete " $y=b+m\cdot(1-e^{\alpha\cdot x}{}_n).$ " and insert -- $y=b+m\cdot(1-e^{\alpha\cdot x^n}).$ --, therefor.

In Column 6, Line 51, delete " $y=b+m\cdot(1-e^{\alpha\cdot x}{}_n)$ " and insert -- $y=b+m\cdot(1-e^{\alpha\cdot x^n})$ --, therefor.

Signed and Sealed this

Thirtieth Day of November, 2010

David J. Kappos
*Director of the United States Patent and Trademark Office*